United States Patent
Platt et al.

(10) Patent No.: US 7,613,363 B2
(45) Date of Patent: Nov. 3, 2009

(54) IMAGE SUPERRESOLUTION THROUGH EDGE EXTRACTION AND CONTRAST ENHANCEMENT

(75) Inventors: John Platt, Redmond, WA (US); Hugues Hoppe, Redmond, WA (US); Erin Renshaw, Kirkland, WA (US); Adrian Corduneanu, Cambridge, MA (US)

(73) Assignee: Microsoft Corp., Redmond, WA (US)

( * ) Notice: Subject to any disclaimer, the term of this patent is extended or adjusted under 35 U.S.C. 154(b) by 376 days.

(21) Appl. No.: 11/165,525

(22) Filed: Jun. 23, 2005

(65) Prior Publication Data
US 2006/0290950 A1 Dec. 28, 2006

(51) Int. Cl.
G06K 9/32 (2006.01)
(52) U.S. Cl. .............. 382/299; 382/260; 382/254; 382/169; 382/100; 382/165; 382/174; 382/199; 382/274; 382/54; 382/173; 358/1.8; 235/491
(58) Field of Classification Search .............. 382/299
See application file for complete search history.

(56) References Cited

U.S. PATENT DOCUMENTS

| 4,630,307 | A | * | 12/1986 | Cok | 382/165 |
| 4,639,782 | A | * | 1/1987 | Fujita et al. | 348/616 |
| 5,210,799 | A | * | 5/1993 | Rao | 382/103 |
| 5,214,751 | A | * | 5/1993 | Robert | 345/606 |
| 5,373,322 | A | * | 12/1994 | Laroche et al. | 348/273 |
| 5,390,029 | A | * | 2/1995 | Williams et al. | 358/448 |
| 5,526,468 | A |   | 6/1996 | Kolb et al. |  |
| 5,600,377 | A | * | 2/1997 | David et al. | 348/452 |
| 5,742,703 | A |   | 4/1998 | Lin et al. |  |
| 5,847,714 | A | * | 12/1998 | Naqvi et al. | 345/668 |
| 5,991,463 | A | * | 11/1999 | Greggain et al. | 382/298 |
| 6,163,621 | A | * | 12/2000 | Paik et al. | 382/169 |
| 6,175,663 | B1 | * | 1/2001 | Huang | 382/284 |
| 6,414,690 | B1 | * | 7/2002 | Balasubramanian et al. | 345/589 |
| 6,430,321 | B1 |   | 8/2002 | Choo |  |
| 6,570,616 | B1 | * | 5/2003 | Chen | 348/272 |

(Continued)

OTHER PUBLICATIONS

"Alpha Estmation in Perceptual Color Space", Lin et al, State Key Lab of CAD&CG, Zhejiang University, HangZhou 310027, P.R. China, 2005 IEEE 0-7803-8874-7.*

(Continued)

*Primary Examiner*—Samir A. Ahmed
*Assistant Examiner*—Tsung-Yin Tsai
(74) *Attorney, Agent, or Firm*—Katrina A. Lyon; Lyon & Harr, LLP

(57) ABSTRACT

A technique for generating high-resolution bitmaps from low-resolution bitmaps. A low-resolution bitmap is magnified to form a magnified image. Edge detection is performed on the magnified image to find high contrast edges. A plurality of image patches of the magnified image are generated. These images patches are analyzed by performing connected components analysis on each of them using the high contrast edges to produce a plurality of foreground and background decisions determining whether a portion of an image patch is a background or a foreground region. Then the contrast of one or more pixels in each of the plurality of image patches is enhanced based on the foreground and background decisions. Finally, the system and method of the invention combines the luminance of the enhanced output pixels with the color values generated by the magnification algorithm. This produces a high-resolution bitmap from the contrast-enhanced pixels.

18 Claims, 9 Drawing Sheets

U.S. PATENT DOCUMENTS

| | | | | |
|---|---|---|---|---|
| 6,577,762 | B1 * | 6/2003 | Seeger et al. | 382/173 |
| 6,636,629 | B1 * | 10/2003 | Sasai | 382/167 |
| 6,690,837 | B1 | 2/2004 | Broddin et al. | |
| 6,771,836 | B2 * | 8/2004 | Lawton | 382/260 |
| 7,242,412 | B2 * | 7/2007 | Sellers | 345/606 |
| 2002/0015508 | A1 * | 2/2002 | Hannigan et al. | 382/100 |
| 2002/0062482 | A1 * | 5/2002 | Bolle et al. | 725/105 |
| 2002/0150159 | A1 * | 10/2002 | Zhong | 375/240.16 |
| 2002/0154134 | A1 | 10/2002 | Matsui | |
| 2002/0171855 | A1 * | 11/2002 | Edge | 358/1.9 |
| 2003/0063203 | A1 * | 4/2003 | Ohno | 348/247 |
| 2004/0042677 | A1 * | 3/2004 | Lee | 382/254 |
| 2004/0062449 | A1 * | 4/2004 | Chiu | 382/260 |
| 2005/0017969 | A1 | 1/2005 | Sen et al. | |
| 2005/0025383 | A1 | 2/2005 | Domingo et al. | |
| 2005/0135672 | A1 * | 6/2005 | Altenhof-Long et al. | 382/162 |
| 2007/0052843 | A1 * | 3/2007 | De Haan | 348/448 |
| 2007/0053433 | A1 * | 3/2007 | Song | 375/240.13 |
| 2007/0126897 | A1 * | 6/2007 | Nagakura | 348/272 |

OTHER PUBLICATIONS

"Perception base Alpha Estimation in Natural Image Matting", 2004, IEEE International Conference on Multimedia and Expo (ICME), (IEEE Cat. No. 04$^{TH}$8763), 2004, vol. 2,p. 1470-10, ISBN: 0-7803-8605-5.*

International Search Report for PCT/US06/22862, Completed Jun. 11, 2007, Mailed Sep. 21, 2007.

Barshadeski, O., Shytiak, I. "Superresoution with Diffusion Function", Technion-Israel Institute of Technology, http://66.102.7.104/search?q=cache;80wDkdcwINMJ:visI.technion.ac.il/projects/1000w23/+image+superresolution+edge&hl=en. Last accessed May 19, 2005.

"Version 1 is a Plug-In for all Applications on Windows or MacOS 9/X", http://graphicssoft.about.com/gi/dynamic/offsite.htm?zi=1/XJ&sdn=graphicssoft&zu=http%3A%2F%2Fwww.humansoftware.com%2Fpages1200%2FXFile%2FHSxfil0.html. Last accessed Jun. 23, 2005.

* cited by examiner

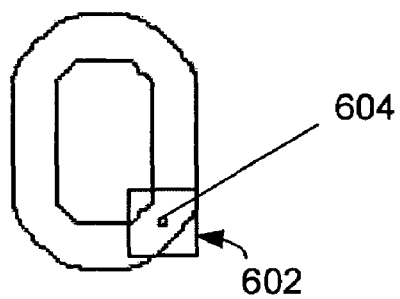
FIG. 4
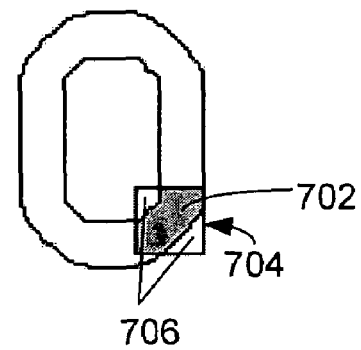
FIG. 5
FIG. 6
FIG. 7

FIG. 9G
FIG. 9H
TRAVEL & FOOD
FIG. 9I
TRAVEL & FOOD
FIG. 9J

IMAGE SUPERRESOLUTION THROUGH EDGE EXTRACTION AND CONTRAST ENHANCEMENT

BACKGROUND

Background Art

High-resolution displays, those greater than or equal to 120 dots per inch, are becoming very common as prices of LCD monitors decrease. As monitor resolution increases, it is desirable for the number of pixels for a line of text or a graphic or a piece of line art to increase, so that it stays the same size on the screen instead of becoming smaller. However, this is typically not the case. Other operations must often be performed to increase the clarity of the text, line art or graphic when they are displayed at a higher resolution.

For text that is generated on the same computer that is displaying the text, increasing the resolution of the text on that computer is not a problem. One can render smooth text at any desired resolution using known font-rendering systems, some which use sub-pixel rendering. These font-rendering systems dramatically improve font display resolution and improve screen readability. Increasing the size of photographs is also typically not a problem. Standard algorithms such as bilinear or bicubic interpolation are capable of magnifying photographs fairly well.

However, sometimes people want to display text, line art, or graphics that they did not generate themselves. This can occur, e.g., when they get bitmaps of text, line art, or graphics over the Internet. For example, in web pages, navigation tabs and graphics are generated once by a graphic artist, and then are stored on a server as a bitmap (a matrix of pixels). When this bitmap is sent to a client and then magnified with a standard magnifying algorithm, the text, line art, or graphics looks terrible. The high-contrast edges look both jaggy and blurry. As is known in the art, a jaggy is the stair-stepping effect a person sees along curves or on the edges of on-screen text or bitmap graphics. In addition, people want to display icons on their high-resolution displays. These icons are bitmaps created at a fixed size by a graphics artist. A user may want to see these icons at a higher resolution, but standard algorithms again make them look jaggy and blurry when their size is increased.

SUMMARY

The image enhancement system and method of the invention provides a technique for generating high-resolution bitmaps from low-resolution bitmaps. In general, the system operates as follows. An original, low-resolution bitmap is magnified to form a magnified image. Once the magnified image is obtained, edge detection is performed on it to find high contrast edges. This can be done by employing a standard edge detection algorithm. In one embodiment of the invention a Canny edge detector is employed. The Canny edge detector used to detect the high contrast edges also serves to smooth any jaggedness that exists in the image. The magnified image is transformed into overlapping image patches. These images patches are analyzed by performing connected components analysis to determine foreground and background regions using the high contrast edges located by the edge detector. Once the foreground and background regions have been determined, the contrast of the center pixel in each of the plurality of image patches is enhanced based on whether the region is a foreground or a background region. Finally, the image enhancement system and method of the invention combines the luminance of the enhanced output pixels with the color values produced by the magnification algorithm used to generate the magnified image resulting in a high-resolution bitmap from the contrast-enhanced pixels.

The image enhancement system and method of the invention produces sharp edges in bitmaps and images containing text, line art, photos and other content. It also removes jaggedness that often accompanies the magnification of such bitmaps. Textures are accurately depicted after magnification because the image enhancement system and method behaves just like a standard magnification filter in image regions that lack high-contrast edges. Furthermore, the image enhancement system and method of the invention is very fast and computationally efficient. This is in part due to the fact that it does not employ iterative algorithms.

In addition to the just described benefits, other advantages of the present invention will become apparent from the detailed description which follows hereinafter when taken in conjunction with the drawing figures which accompany it.

DESCRIPTION OF THE DRAWINGS

The specific features, aspects, and advantages of the invention will become better understood with regard to the following description, appended claims, and accompanying drawings where:

FIG. 4 is an exemplary magnified image that can be employed with the image enhancement system and method according to the invention.

FIG. 5 is an exemplary magnified image after high contrast edges have been located and smoothed by the image enhancement system and method according to the invention.

FIG. 6 shows a typical image patch that contains two edges with the center pixel annotated.

FIG. 7 shows an image region connected to the center pixel without crossing an edge.

FIG. 9A shows a text bitmap enlarged by four times using only bicubic interpolation, while FIG. 9B shows the same text bitmap enlarged by four times using the image enhancement system and method according to the invention.

FIG. 9C was enlarged using only bicubic interpolation, while FIG. 9D was enlarged using the image enhancement system and method according to the invention.

FIG. 9E shows an icon bitmap enlarged by four times using bicubic interpolation, while

FIGS. 9G and 9H show a website sign in button enlarged by four times. FIG. 9G was enlarged using only bicubic interpolation, while FIG. 9H was enlarged using the system and method according to the invention.

FIG. 9I shows a logo bitmap enlarged by four times using only bicubic interpolation, while FIG. 9J shows the same logo bitmap enlarged by four times using the image enhancement system and method according to the invention.

DETAILED DESCRIPTION OF THE PREFERRED EMBODIMENTS

In the following description of the preferred embodiments of the present invention, reference is made to the accompanying drawings that form a part hereof, and in which is shown by way of illustration specific embodiments in which the invention may be practiced. It is understood that other embodiments may be utilized and structural changes may be made without departing from the scope of the present invention.

1.0 Exemplary Operating Environment

Figure 1:
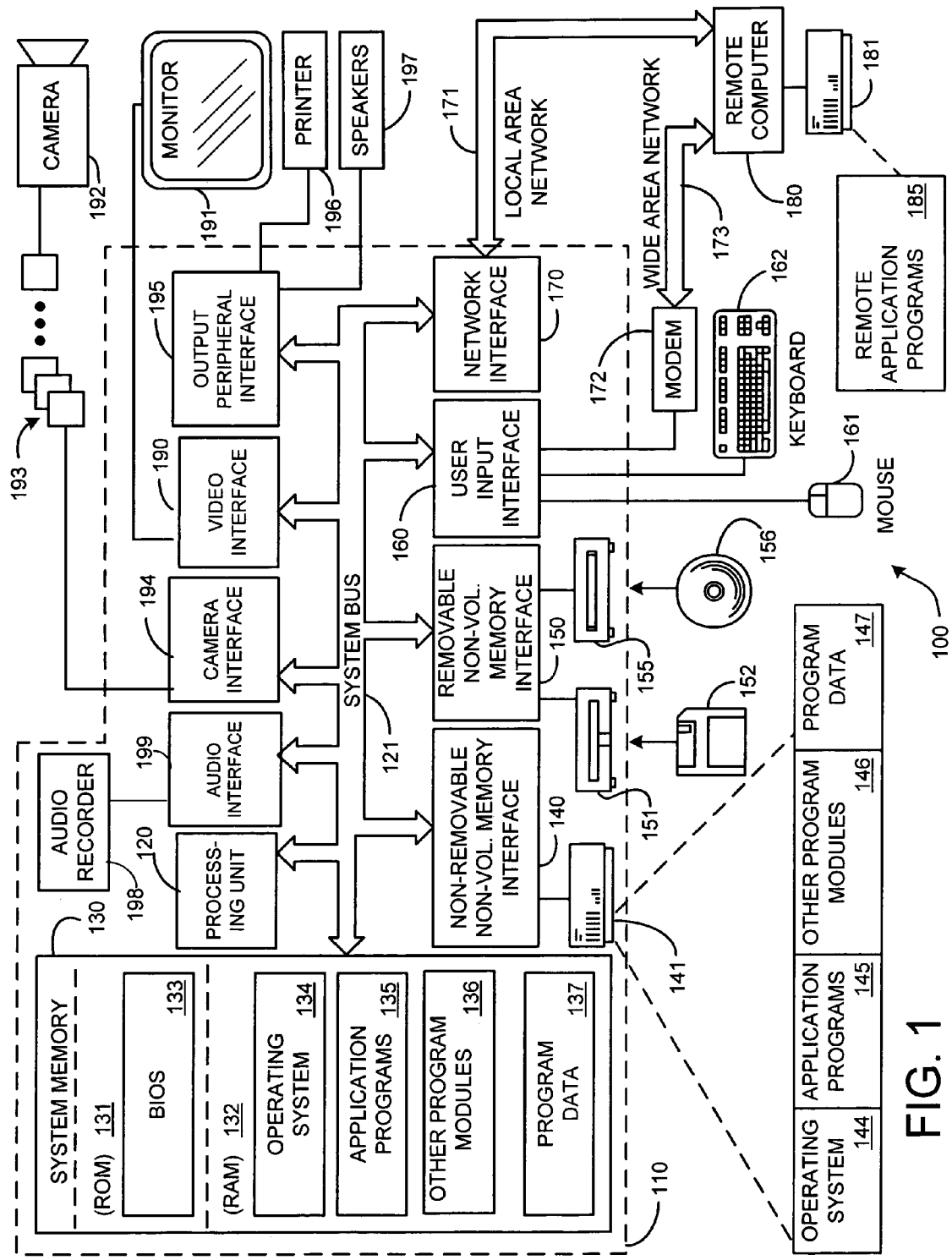
FIG. 1 is a diagram depicting a general purpose computing device constituting an exemplary system for implementing the invention.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through anon-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195. Of particular significance to the present invention, a camera 192 (such as a digital/electronic still or video camera, or film/photographic scanner) capable of capturing a sequence of images 193 can also be included as an input device to the personal computer 110. Further, while just one camera is depicted, multiple cameras could be included as an input device to the personal computer 110. The images 193 from the one or more cameras are input into the computer 110 via an appropriate camera interface 194. This interface 165 is connected to the system bus 121, thereby allowing the images to be routed to and stored in the RAM 132, or one of the other data storage devices associated with the computer 110. However, it is noted that image data can be input into the computer 110 from any of the aforementioned computer-readable media as well, without requiring the use of the camera 192. An audio recorder 198 can also be connected to the computer via an audio interface device 199 for the purpose of capturing audio data.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The exemplary operating environment having now been discussed, the remaining parts of this description section will be devoted to a description of the program modules embodying the invention.

2.0 Image Superresolution Through Edge Extraction and Contrast Enhancement

After describing an overview of the image enhancement system and its method of operation, details are described in the following sections.

2.1 System Overview.

Figure 2:
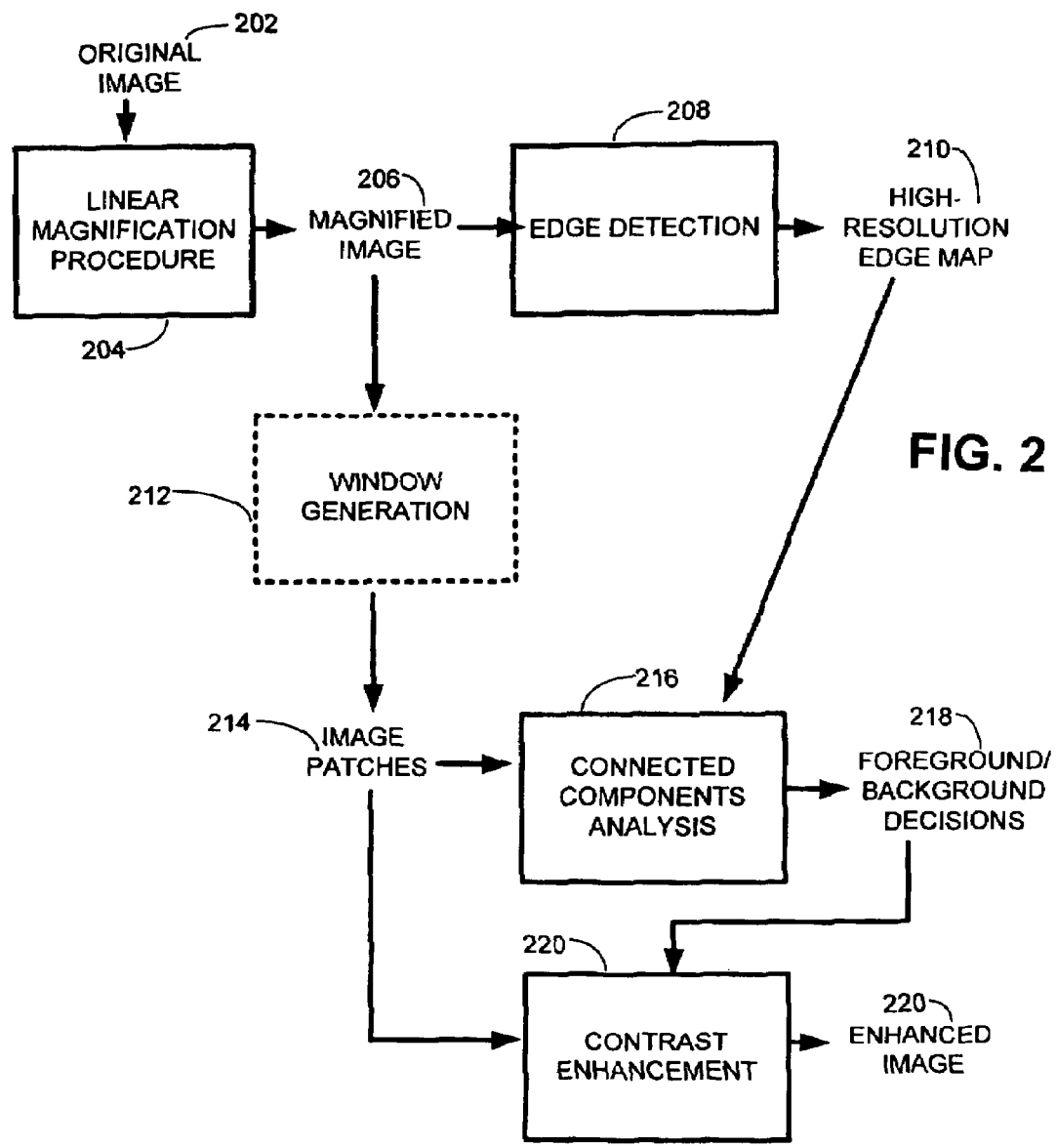
FIG. 2 is an overall block diagram of the image enhancement system according to the invention.

A general exemplary overall system diagram of one embodiment of the image enhancement system according to the invention is shown in FIG. 2. An image 202 is input into the system and a linear magnification module 204 produces a magnified image 206. The magnified image 206 is then input into an edge detection module 208 that detects high contrast edges to produce an edge map 210. The magnified image 206 can be input into a window generation module 212 that transforms the magnified image 206 into windows that are used to generate image patches 214. The image patches 214 and edge map 210 are analyzed in a connected components analysis module 216 which uses connected components analysis to determine which regions of each image patch of the magnified image 206 are foreground and which are background, resulting in foreground and background decisions 218. The connected component analysis module 216 finds all pixels that are connected to a center pixel, whose path of connection does not cross an edge pixel. The foreground and background regions of each of the image patches 214 are then input into a contrast enhancement module 220 which enhances the contrast of the central pixel in each of the image patches 214 that contain an edge. Enhancing the contrast serves to sharpen the image, because the edges in the final output will have a higher gradient, and hence will appear sharper. Finally, the system and method of the invention combines all of the luminances of the enhanced output pixels with the color values produced by the magnification algorithm used to generate the magnified image to produce a high-resolution bitmap 222 from the contrast-enhanced pixels.

2.2 Overview of Method of Operation.

Figure 3:
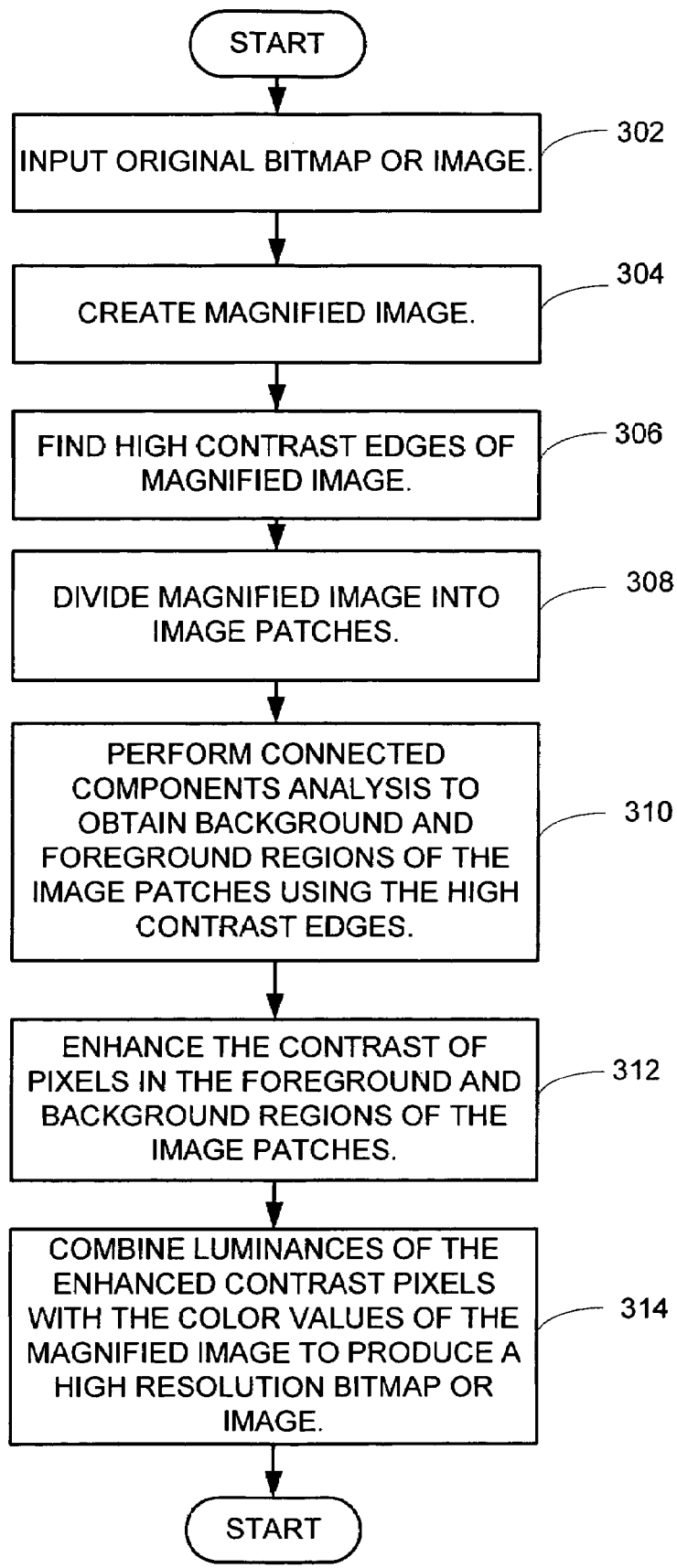
FIG. 3 is a general flow diagram showing the operation of an exemplary embodiment of the image enhancement system according to the invention.

In general, as shown in FIG. 3, the image enhancement system operates as follows. An original, low-resolution bitmap is input (process action 302) and magnified to form a magnified image (process action 304). Once the magnified image is obtained, edge detection is performed on it to find high contrast edges (process action 306). This is typically done by employing a standard edge detection algorithm. In one embodiment of the invention a Canny edge detector is employed that also serves to smooth any jaggedness that exists in the image. Once the edges are found, a plurality of image patches of the magnified image are generated (process action 308). These patches may be generated by looping over the pixels of the magnified image and considering a square neighborhood (e.g., of 17 by 17 pixels) around each pixel. These neighborhoods need not be generated in parallel: one neighborhood may be considered at a time. For best results, the size of the neighborhood should depend on the magnification factor. For example, the size of the neighborhood can be the first odd number above three times the magnification factor. These images patches are analyzed by performing connected components analysis on each of them (combined with the same neighborhood taken out of the edge map) to produce a plurality of foreground/background decisions for the regions of the image patches using the high contrast edges located by the edge detector, as shown in process action 310.

Then the contrast of one or more pixels in each of the plurality of image patches is enhanced based on whether a region is a foreground or a background region (process action 312). Finally, the system and method of the invention combines all of the luminances of the enhanced output pixels with the color values produced by the magnification algorithm used to generate the magnified image to produce a high-resolution bitmap from the contrast-enhanced pixels (process action 314).

2.3 Magnification of Original Image.

As described above, the first step of the image enhancement system of the invention is to input an original image or bitmap and then magnify it. In one embodiment this is done by applying a standard linear magnification algorithm to an input image to produce a magnified image of the desired resolution. Various conventional algorithms can be used to magnify the image, such as by using bilinear or bicubic interpolation. Alternatively, this action can be performed by using any magnification algorithm, as the image enhancement system of the invention serves as a post-processing step to any other magnification algorithm.

The magnified image may look like that shown in FIG. 4. The example shown in FIG. 4 was generated by applying bicubic interpolation to a bitmap of the word "also". One can see that the magnified bitmap is very blurry and jaggy.

2.4 Applying Edge Detection to Find High Contrast Edges.

Once the image has been magnified, the next step is to apply an edge detection algorithm to the magnified image to find the edges in the image. For images comprising both texture and one or more of text, line art, and graphics, it is best to only keep the edges that are high contrast. These high contrast edges would tend to appear only in the text, line art, and graphics, while edges in texture would be lower contrast and not affected by the image enhancement algorithm.

The best known edge detector is the Canny edge detector, although the image enhancement system of the invention will work with other edge detectors, such as, for example, Laplacian-of-Gaussian-based. Any conventional edge detector can be used. In one embodiment, a Canny edge detector is applied to the magnified image. The Canny edge detector first smoothes the magnified image to eliminate noise. It then finds the image gradient to highlight regions with high spatial derivatives. The Canny algorithm, which is well known in the art, then tracks along these regions and suppresses any pixel that is not at the maximum (this is called non-maximum suppression). The gradient array is then further reduced by hysteresis. Hysteresis is used to track along the remaining pixels that have not been suppressed. Hysteresis uses two thresholds and if the magnitude is below the first threshold, it is set to zero (it is made a non-edge). If the magnitude is above the high threshold, it is made an edge. And if the magnitude is between the two thresholds, then it is set to zero unless there is a path from this pixel to a pixel with a gradient above the high threshold. In one embodiment of the invention, a Canny edge detector is used with high threshold equal to 0.4 times the largest edge gradient magnitude, a low threshold equal to 0.16 times the largest edge gradient magnitude, and filtering with a Gaussian derivative filter with sigma equal to 0.47 times M (where M is the magnification). This results in a smooth edge map that looks like the image shown in FIG. 5. This smooth edge map serves to remove the jaggies from the image. It is desirable for the final high-resolution bitmap to have edges that closely follow the edges in the edge map.

2.5 Creation of Image Patches.

The system then breaks the magnified image up into image patches. Operating on image patches is typical for many image processing algorithms. These patches may be generated by applying a window around every pixel in the magnified image In one embodiment, the height and width of the windows used are 2*M (where M is the magnification factor), rounded up to the nearest odd window size. One embodiment of the image enhancement system and method of the present invention ignores any image patch that does not have an edge pixel within it. In FIG. 6, a typical image patch that contains an edge is shown as a square 602 (with the central pixel 604 shown).

2.6 Connected Component Analysis.

For each image patch containing an edge pixel, the system and method of the invention performs connected components analysis to find all pixels that are connected to the center pixel, whose path of connection does not cross an edge pixel. There are several well-known algorithms for performing this analysis, such as, for example, recursive flood fill and non-recursive flood fill. This analysis produces something that can be visualized as shown in FIG. 7, where the shaded region 702 is connected to the center pixel without crossing an edge. Using this region, the system and method of the invention can make a foreground/background decision. Call this shaded region "region A." Call the rest of the pixels in the window 704 "region B" 706. One of these regions is the foreground and the other is the background. It does not matter to the system which is which: the system just operates on the two regions.

2.7 Contrast Enhancement.

Once the pixels that are connected to the center pixel and whose connection path does not cross an edge pixel are found, the image enhancement system and method of the invention is ready to enhance the contrast of the central pixel in the image patch. Enhancing the contrast serves to sharpen the image, because the edges in the final output will have a higher gradient, and hence will appear sharper.

Figure 8:
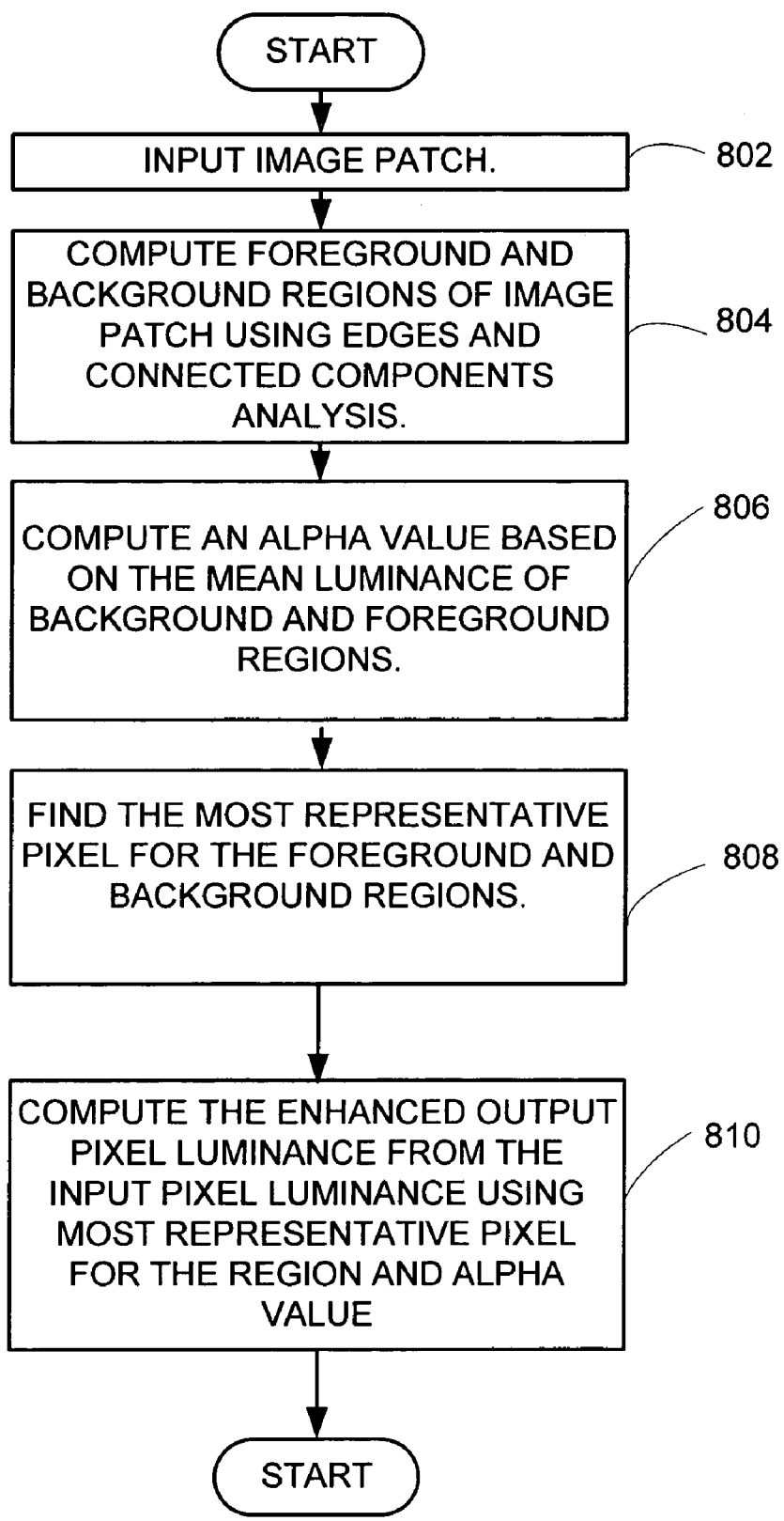
FIG. 8 depicts an exemplary flow diagram of the process of enhancing the contrast of foreground and background pixels employed by one embodiment of the image enhancement system according to the invention.

In general, the process of contrast enhancement is shown in FIG. 8. An input patch is input, as shown in process action 802. The foreground and background regions of the image patch are computed using the edges of the edge map and connected components analysis (process action 804). A blending factor or alpha value is computed based on the mean luminances of the background and foreground regions (process action 806). The most representative pixel of the foreground or background regions is found (process action 808). The enhanced output pixel luminances are computed for each foreground and background region using the most representative pixel for the region and the computed alpha value (process action 810).

Mathematically, this can be described as follows. Let the mean luminance of region A be mean_A and the mean luminance of region B be mean_B. The farther these are apart, the more certain one can be that region A and region B each correspond to the foreground and background (or visa versa). One can compute an blending factor (alpha value), depending on mean_A and mean_B:

$$\text{alpha} = \tan h(2.5 * \text{abs}(\text{mean}\_A - \text{mean}\_B))$$

Of course, other functions can be used, also, such as simply min(abs(mean_A−mean _B),1).

This alpha value is used to blend between the luminance of the central pixel and the luminance of the most representative pixel in region A. The blend is applied to the center pixel. Because every pixel in the magnified image is in the center of a window, all magnified pixels are considered (if the corresponding window contains an edge pixel). If mean_A>mean_B, one wants to find the brightest pixel in region A, which would be least corrupted and blurred with the pixels in region B. Conversely, if mean_A<mean_B, the darkest pixel in region A is the best pixel. Therefore, if the mean luminance of region A (the region containing the center pixel) is brighter than the mean luminance of region B, then the center pixel should have its pixel value moved towards the brightest (maximum) pixel in region A. The parameter alpha specifies how much towards the brightest pixel the system and method of the invention changes the brightness of the center pixel. If alpha is equal to 1, the most contrast enhancement will be provided (recall that alpha=1 corresponds to a high-contrast region, i.e. with a large difference between mean_A and mean_B). If alpha is equal to 0, the image enhancement system and method of the invention does not change the center pixel at all. If the mean luminance of region A is darker than the mean luminance of region B, then the center pixel should have its pixel value moved towards the darkest (minimum) pixel in region A.

Mathematically, one can compute the enhanced output pixel luminance from the input pixel luminance:

if (mean$_{A>mean\_B}$)
   out=alpha*max(region A)+(1-alpha)*in else out=alpha*min(region A)+(1-alpha)*in Other contrast enhancement algorithms (such as median filtering) can also be used.

2.8 Producing a High Resolution Bitmap from the Contrast Enhanced Pixels.

Finally, for the center pixel of each image patch, the system and method of the invention combines all of the luminances of the enhanced output pixels with the color values produced by the standard linear magnification algorithm to produce the final enhanced image. In other words, the image enhancement system and method of the invention does not contrast enhance the color signal, only the brightness signal. This may be done by employing any of many standard methods for converting a RGB pixel into 3 channels (luminance and two color channels) and back to RGB again. In one embodiment of the invention, YIQ space is used (where Y is luminance and I,Q are two color channels). Also, in one embodiment of the invention, the pixels are not modified in place, but a new image is created. Therefore, the modification of pixels does not alter the windows of subsequently considered pixels.

3.0 Exemplary Working Embodiment

Some exemplary results obtained by using one embodiment of the image enhancement system and method of the invention are shown in FIGS. 9A through 9J. The following figures were magnified by four.

Figures 9A, 9B:
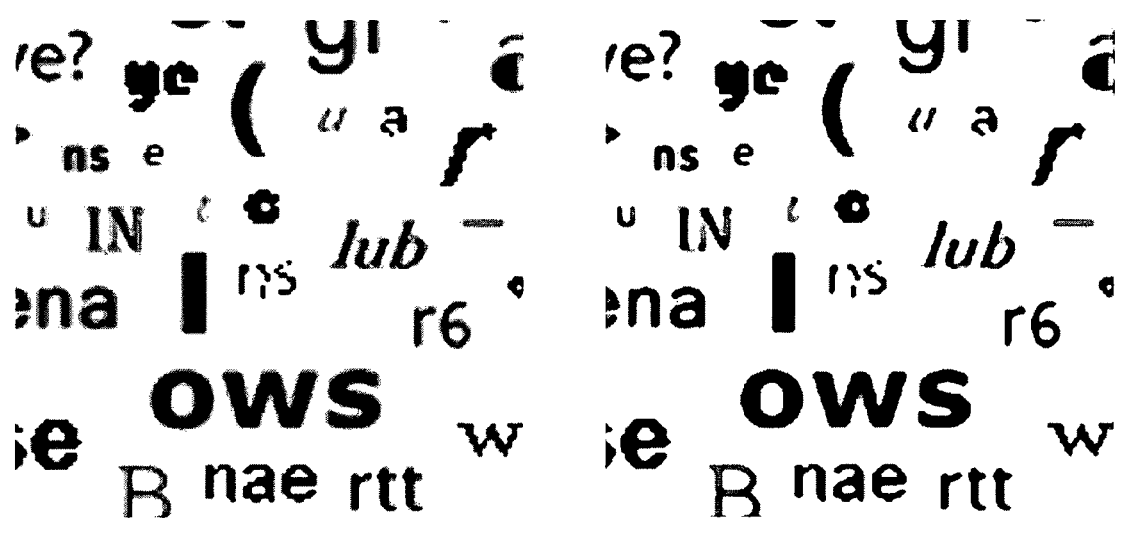

FIG. 9A shows an image obtained using bicubic interpolation on text, while FIG. 9B shows an image obtained using the image enhancement system of the invention on the same text. One can see that the text in FIG. 9B is much less blurred and jagged than the text shown in FIG. 9A.

Figure 9D:
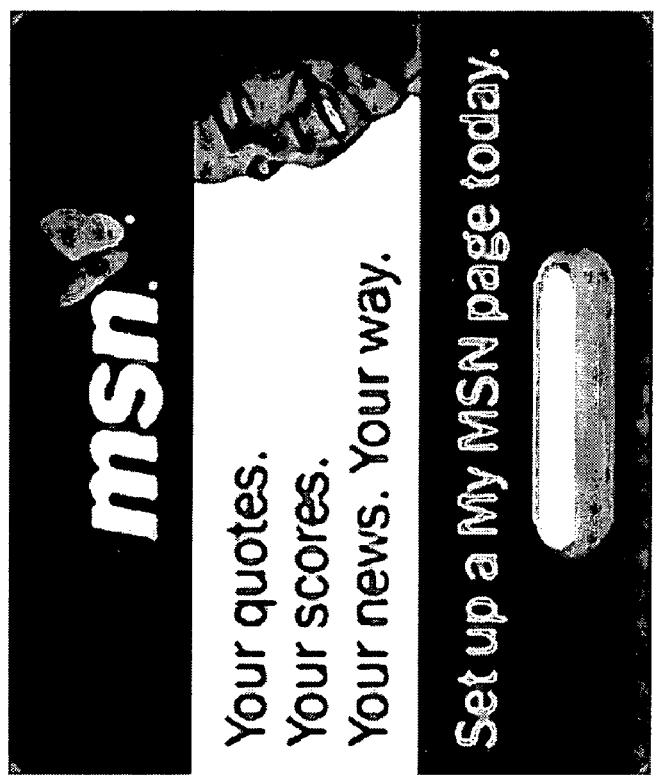
FIGS. 9C and 9D show the same web advertisement bitmap, enlarged by four times.
Figure 9C:
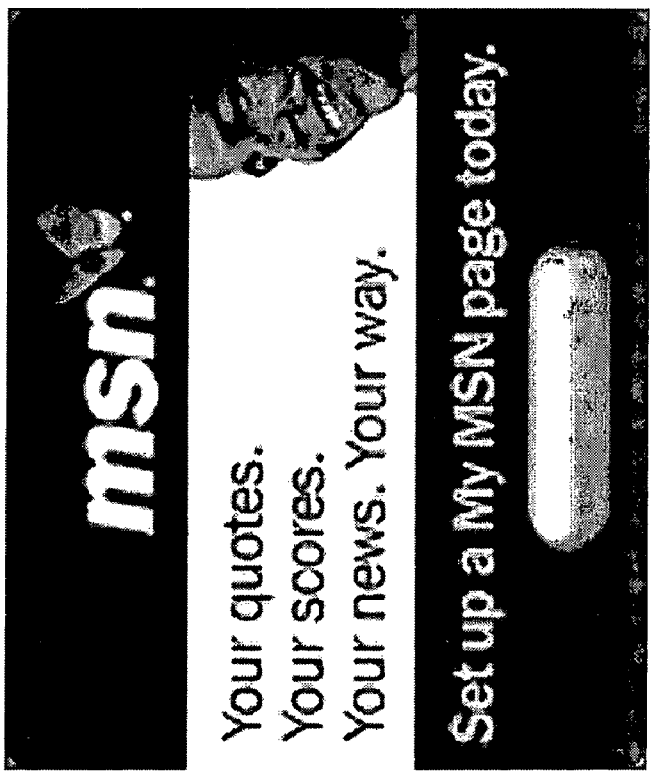

Similarly, FIG. 9C and FIG. 9D show the same web advertisements magnified four times. FIG. 9C was enlarged using only bicubic interpolation. FIG. 9D was enlarged using the image enhancement system of the invention. Again, the web advertisement enlarged using the image enhancement system of the invention in FIG. 9D is much clearer and more readable than that shown in FIG. 9C.

Figure 9F:
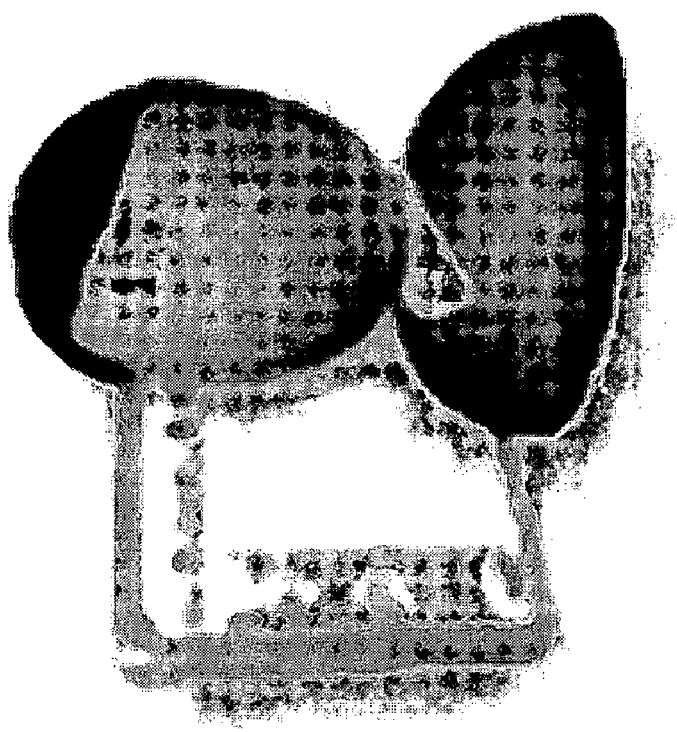
FIG. 9F shows the same icon bitmap enlarged by four times using only the image enhancement system and method according to the invention.
Figure 9E:
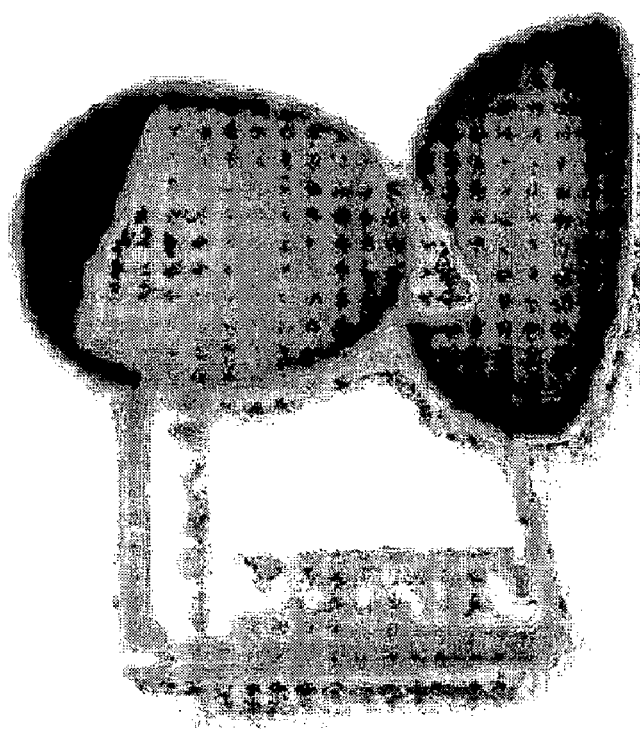

FIGS. 9E and 9F depict an icon that was enlarged four times. FIG. 9E was again enlarged with only bicubic interpolation, while FIG. 9F was enlarged using the image enhancement system and method according to the invention. Again, FIG. 9F is much clearer and the edges are much sharper than the icon shown in FIG. 9E.

FIGS. 9G and 9H depict the same sign in icon enlarged four times. FIG. 9G was enlarged with only bicubic interpolation, while FIG. 9H shows the same icon enlarged with the image enhancement system of the invention. The icon shown in FIG. 9H is much less blurry than that shown in FIG. 9G.

Finally, FIG. 9I shows a logo enlarged with bicubic interpolation and a logo enlarged with the image enhancement system of the invention is shown in FIG. 9J. The text in FIG. 9J is much more clear and more readable than that of FIG. 9I.

The image enhancement system of the invention takes approximately 2.5 seconds to a enlarge a bitmap to a 1600×1200 pixel resolution on a 3.2 GHZ Pentium 4 processor.

The foregoing description of the invention has been presented for the purposes of illustration and description. It is not intended to be exhaustive or to limit the invention to the precise form disclosed. Many modifications and variations are possible in light of the above teaching. Further, it should be noted that any or all of the aforementioned alternate embodiments may be used in any combination desired to form additional hybrid embodiments. It is intended that the scope of the invention be limited not by this detailed description, but rather by the claims appended hereto.

Wherefore, what is claimed is:

1. A method for generating high-resolution bitmaps from low-resolution bitmaps, comprising the process actions of:
   using a computing device for, magnifying a low-resolution bitmap to form a magnified image; performing edge detection on the magnified image to produce an edge map; generating a plurality of image patches of the magnified image;
   performing connected components analysis coupled to each of the plurality of image patches and the edge map, to identify one or more foreground and background regions for each image patch, wherein performing connected components analysis further comprises:
   determining foreground and background regions of each image patch; and
   computing a blending factor based on the mean luminances of the foreground and background regions;
   enhancing the contrast of one or more pixels in each of the plurality of image patches, said enhancing depending on whether the pixel is in the foreground or background region; and
   producing a high-resolution bitmap from the contrast-enhanced pixels.

2. The method of claim 1 wherein the magnifying process action comprises one of;
   using bilinear interpolation to magnify the image; or
   using bicubic interpolation to magnify the image.

3. The method of claim 1 wherein the edge detecting process action comprises using a Canny edge detector to find the high contrast edges used to generate the edge map.

4. The method of claim 3 wherein the edge detecting process action further comprises smoothing the edges of the edge map.

5. The method of claim 1 wherein the size of each image patch depends on the magnification used in the magnification process.

6. The method of claim 1 wherein the process action of performing a connected components analysis employs a recursive flood fill component analysis.

7. The method of claim 1 wherein the process action of performing a connected components analysis employs a non-recursive flood fill component analysis.

8. The method of claim 1 wherein the process action of performing connected components analysis comprises finding all pixels that are connected to the center pixel in the image patch whose path of connection does not cross an edge pixel within the image patch.

9. The method of claim 1 wherein the process action of enhancing the contrast of one or more pixels comprises enhancing the contrast of the center pixel in each image patch to make it more representative of the luminance of the foreground or background region the center pixel is in.

10. The method of claim 9 wherein an alpha value is used to blend the luminance of the center pixel of each image patch and a most representative pixel for the luminance in the foreground or background region that the center pixel is in to produce the contrast enhanced output pixels.

11. The method of claim 1 wherein the process action of producing a high resolution bitmap from the contrast-enhanced pixels comprises combining luminances of the contrast-enhanced output pixels with color values produced by a magnification algorithm used to form the magnified image.

12. The method of claim 1 wherein the process action of magnifying a low-resolution bitmap to form a magnified image comprises magnifying a low resolution image that contains one or more of:
  graphics;
  text; or
  line art.

13. A computer-readable storage medium having computer-executable instructions stored thereon for generating a high-resolution bitmap from a low-resolution bitmap, said computer-executable instructions comprising:
  magnifying a low-resolution image to form a magnified image;
  performing edge detection on the magnified image to produce an edge map;
  generating a plurality of image patches of the magnified image;
  performing connected components analysis on each of the plurality of image patches and the edge map, to produce a plurality of foreground/background decisions;
  enhancing the contrast of one or more pixels in each of the plurality of image patches, said enhancing depending on the foreground/background decisions, wherein the computer-executable instruction for enhancing the contrast of one or more pixels comprises:
  inputting an image patch;
  computing foreground and background regions based on the foreground and background decisions; computing an alpha value based on the mean luminance of the background and foreground region;
  finding the most representative pixel for the foreground and background regions; and
  computing the enhanced output pixel luminance from the input pixel luminance using the most representative pixel for the luminance of the foreground or background region and the alpha value; and
  producing a high-resolution bitmap from the contrast-enhanced pixels.

14. A system for generating an enhanced image, comprising:
  a general purpose computing device;
  a computer program encoded on a computer-readable medium comprising program modules executable by the general purpose computing device, wherein the computing device is directed by the program modules of the computer program to, perform edge detection on an image to produce an edge map;
  generate a plurality of image patches of the image using a plurality of windows applied to the image;
  perform connected components analysis on each of the plurality of image patches of the image to find all pixels that are connected to the center pixel of the image patch whose path of connection does not cross an edge pixel, wherein the program module to perform connected components analysis further comprises a sub-module to: determine foreground and background regions of each image patch; and
  compute a blending factor based on the mean luminances of the foreground and the background regions;
  enhance the contrast of one or more pixels in each of the plurality of image patches, said enhancing depending on the results of connected components analysis; and
  produce an enhanced image from the contrast-enhanced pixels.

15. The system of claim 14 wherein the program module to detect the edges employs a Canny edge detector.

16. The system of claim 14 wherein in the program module to generate a plurality of image patches of the magnified image using a plurality of windows applied the magnified image the size of each window depending on the magnification used to create the magnified image.

17. The system of claim 14 wherein the program module to enhance the contrast of one or more pixels comprises a sub-module to:
  for each image patch that contains an edge pixel,
    enhance the luminance of the center pixel by using the blending factor to blend between the luminance of the center pixel of the image patch and the most representative pixel of the luminance of the background or foreground region the image patch is in.

18. The system of claim 14 wherein the plurality of windows are overlapping.

* * * * *